US008693989B2

(12) United States Patent
Bocking et al.

(10) Patent No.: US 8,693,989 B2
(45) Date of Patent: *Apr. 8, 2014

(54) METHOD OF MAKING PHONE CALLS FROM A LOCKED OUT HANDHELD ELECTRONIC DEVICE AND A HANDHELD ELECTRONIC DEVICE INCORPORATING THE SAME

(75) Inventors: Andrew D. Bocking, Waterloo (CA); Raymond P. Vander Veen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 652 days.

This patent is subject to a terminal disclaimer.

(21) Appl. No.: 12/549,576

(22) Filed: Aug. 28, 2009

(65) Prior Publication Data

US 2009/0318117 A1    Dec. 24, 2009

Related U.S. Application Data

(63) Continuation of application No. 10/988,270, filed on Nov. 12, 2004, now Pat. No. 7,603,105.

(51) Int. Cl.
*H04M 1/66* (2006.01)
*H04M 1/68* (2006.01)
*H04M 3/16* (2006.01)

(52) U.S. Cl.
USPC ................................................ 455/411

(58) Field of Classification Search
USPC .............................. 455/403–422.1
See application file for complete search history.

(56) References Cited

U.S. PATENT DOCUMENTS

| 5,884,193 | A | 3/1999 | Kaplan |
| 6,400,939 | B1 * | 6/2002 | Virtanen et al. ............... 455/410 |
| 6,799,155 | B1 * | 9/2004 | Lindemann et al. ............ 703/24 |
| 7,302,272 | B2 | 11/2007 | Ackley |
| 7,373,183 | B2 * | 5/2008 | Brudos ......................... 455/572 |
| 7,400,891 | B2 | 7/2008 | Aaron |
| 7,689,209 | B1 * | 3/2010 | Spitz et al. .................... 455/419 |
| 2002/0068599 | A1 * | 6/2002 | Rodriguez et al. ............ 455/550 |
| 2003/0050054 | A1 | 3/2003 | Siu |
| 2004/0192388 | A1 | 9/2004 | Dupuis et al. |
| 2005/0070250 | A1 * | 3/2005 | Scalisi et al. .................. 455/411 |
| 2005/0154935 | A1 | 7/2005 | Jin |
| 2005/0288002 | A1 * | 12/2005 | Sparks et al. ................. 455/418 |
| 2006/0025110 | A1 | 2/2006 | Liu |

OTHER PUBLICATIONS

Research in Motion Limited, "BlackBerry Wireless Handheld from Nextel User Guide", Nov. 7, 2003, pp. i-ii and 118-121.
Research in Motion Limited, "BlackBerry Security White Paper Release 4.0", 2004, pp. 1-888 and 1-31.

* cited by examiner

*Primary Examiner* — Ajit Patel

(57) ABSTRACT

Outgoing phone calls can be made on a handheld electronic device that has been locked to prevent unauthorized use through an override that permits the making of outgoing phone calls while applications additional to the phone application remain locked. In some embodiments, the override can not be selected unless first enabled by a remotely generated enable override authorization signal.

20 Claims, 9 Drawing Sheets

| Options |
|---|
| Firewall |
| Host Routing Table |
| Key Stores |
| Language |
| Message Services |
| Network |
| Owner |
| Screen/Keyboard |
| Security |

*FIG.3B*

| Security | |
|---|---|
| Password: | Disabled |
| Security Timeout | 2 Min |
| Lock Handheld Upon Holstering | No |
| Content Protection | Disabled |
| Content Compression | Enabled |
| Allow Outgoing Call While Locked | No |
| Services: | |
| *** no services *** | |

METHOD OF MAKING PHONE CALLS FROM A LOCKED OUT HANDHELD ELECTRONIC DEVICE AND A HANDHELD ELECTRONIC DEVICE INCORPORATING THE SAME

CROSS REFERENCE TO RELATED APPLICATION

This application is a continuation of U.S. patent application Ser. No. 10/988,270, filed Nov. 12, 2004, entitled METHOD OF MAKING PHONE CALLS FROM A LOCKED OUT HANDHELD ELECTRONIC DEVICE AND A HANDHELD ELECTRONIC DEVICE INCORPORATING THE SAME.

BACKGROUND OF THE INVENTION

1. Field of the Invention

Aspects of this invention relate to arrangements for permitting limited access to the applications in a handheld electronic device for making outgoing phone calls while maintaining protection against unauthorized access to other applications and their stored data.

2. Background Information

As the functionality of handheld electronic devices continues to expand, more and more data of the user enterprise become potentially available virtually anywhere. This has raised serious concerns among security personnel of such enterprises. A common response has been to incorporate a timeout security function into the handheld electronic device that is activated after a selected interval of nonuse, for example two minutes, or upon activation by the user. All operation of the device, including making of outgoing phone calls is blocked; however, incoming phone calls can be received and answered. In order to place a call or perform any other operation (other than receiving incoming phone calls), the lockout must be deactivated. A security code or password must be entered to deactivate the lockout for further operation of the device. This security feature protects data stored and/or available through the device should it become lost, stolen, or otherwise fall into the wrong hands. However, this lockout feature can inconvenience the user in making phone calls at it requires entry of the security code. The timed lockout can be selectively imposed over a wireless connection by a supervisor or it can be set in the device and protected by a higher level password.

SUMMARY OF THE INVENTION

Various embodiments of the invention are directed to a handheld electronic device and a method of operation that balance security concerns and convenience of use. In accordance with aspects of the invention, the handheld electronic device has a phone application and other applications that may be locked out except for the receipt of incoming phone calls. An override is selectable to override the lockout to the extent that outgoing phone calls may be made while the other applications remain locked out. The override must be enabled before it can be selected, and it can only be enabled when the lockout is deactivated. In accordance with some embodiments of the invention, the override can only be enabled if it is first authorized by an enable override authorization signal transmitted over a wireless connection from a remote supervisory position.

Other aspects of the invention are directed to arrangements and procedures for making outgoing phone calls while the lockout is overridden. For instance, such outgoing calls can be made from a hot list that can be: a list of most recent phone calls, a list of most frequently called phone numbers or a call log style list. Alternatively, or in addition, outgoing phone calls can be made during override of the lockout through speed dialing in which certain keys of the user interface keyboard are programmed to dial preselected phone numbers.

More particularly, aspects of the invention are directed to a handheld electronic device that comprises a phone application for making outgoing phone calls and for receiving incoming phone calls and at least one additional application. A lockout locks out the making of outgoing phone calls and all additional applications while allowing the receipt of incoming phone calls when the lockout is activated. An override is selectable to allow the making of outgoing phone calls by the phone application while maintaining the lockout of all of the additional applications when the lockout is activated.

In addition, aspects of the invention are directed more particularly to a method of operating a handheld electronic device that has a phone application and other applications that comprises selectively locking out the other applications and the making of outgoing phone calls by the phone application while allowing receipt of incoming phone calls and overriding the locking out of the making of outgoing phone calls by the phone application while maintaining the lockout of the other applications, and making an outgoing phone call while the other applications remain locked out.

BRIEF DESCRIPTION OF THE DRAWINGS

A full understanding of the invention can be gained from the following description of the preferred embodiments when read in conjunction with the accompanying drawings in which:

FIGS. 3a through 3m are screens that appear on the display of the handheld electronic device of FIG. 1 illustrating operation of various embodiments of the invention.

FIG. 4 is a flowchart illustrating aspects of the invention directed to making a call from a handheld electronic device that has a lockout and an override for the lockout.

FIG. 5 is a flowchart showing aspects of the invention directed to the selection of the override which allows outgoing calls to be made while the device is locked.

DESCRIPTION OF THE PREFERRED EMBODIMENTS

Figure 1:
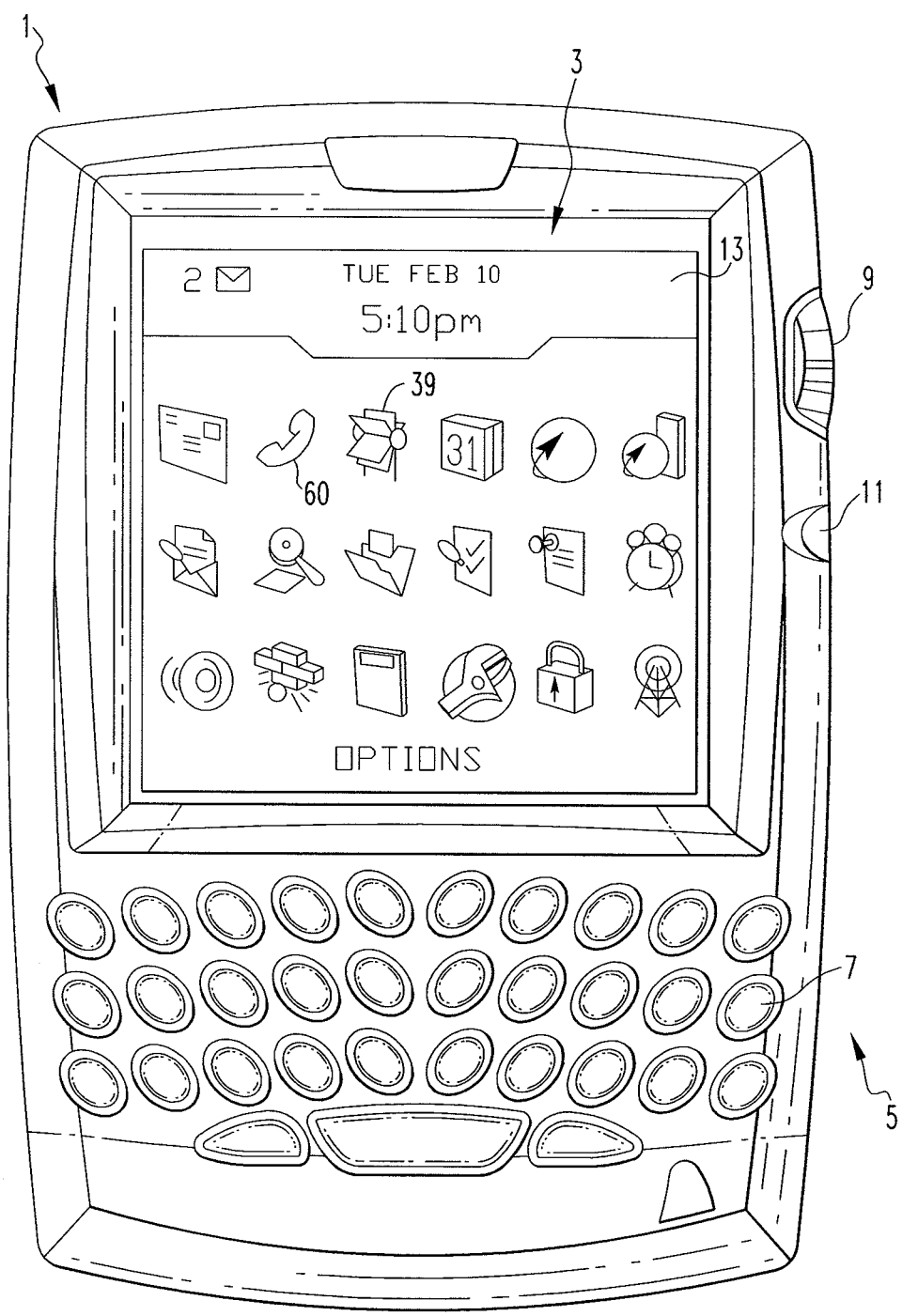
FIG. 1 is a front view of a handheld electronic device incorporating the invention.

FIG. 1 illustrates a handheld electronic device 1 incorporating the various aspects of the invention. Such a handheld electronic device 1 has a user interface 3 that includes a keyboard 5 with a number of keys 7, a thumbwheel 9, an escape button 11 and a display 13. The keys 7, thumbwheel 9, and escape button 11, allow the user to input, select and manipulate, text, data and functions that are represented on the display 13, as is known.

Figure 2:
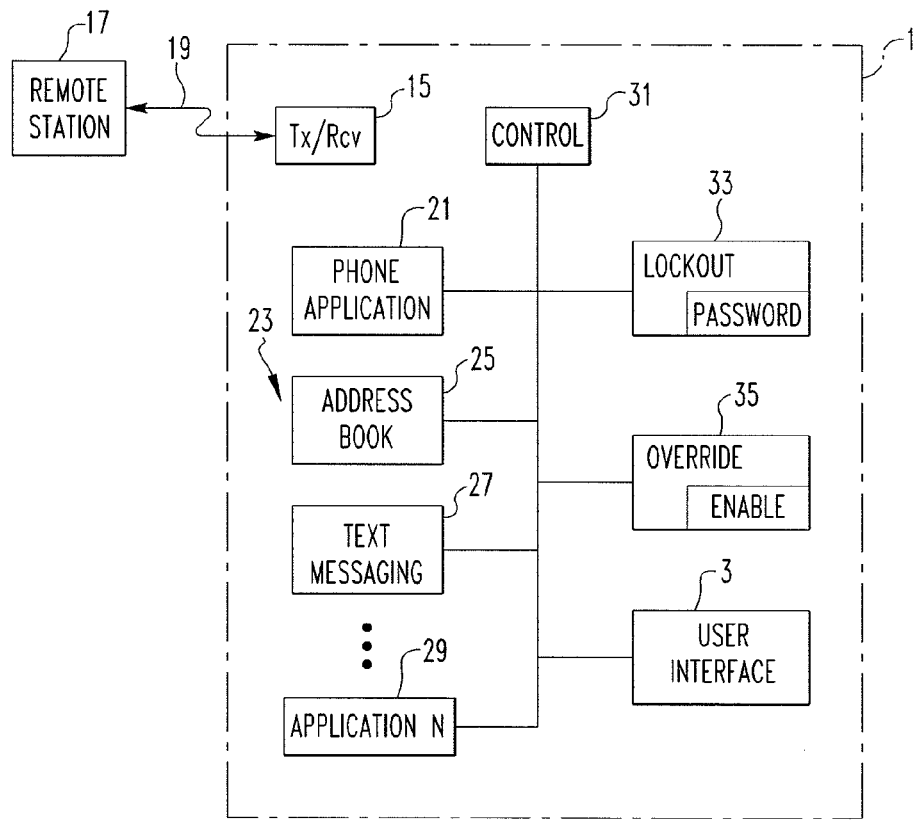
FIG. 2 is a functional diagram of the pertinent functions of the handheld electronic device of FIG. 1.

The functional structure of the handheld electronic device 1 is illustrated in FIG. 2. A transmitter/receiver 15 gives the device 1 the capability of wireless communication with other devices such as a remote supervisory station 17 through various wireless networks such as a cell phone network (i.e. GSM/GPRS, CDMA, or IDEN), wireless internet, wireless intranet and the like, that permit the device to transmit and receive voice and data. These networks can include connection to the world wide web. The handheld electronic device has a phone application 21 for making outgoing and receiving incoming phone calls. It may also have any number of additional applications 23 such as an address book 25, a text messaging application 27 and others, up through an application 29 designated as "n" in FIG. 2. These applications as well as the transmitter/receiver 15 are controlled and sequenced by the control 31 in response to commands received from the user interface 3.

As discussed above, enterprises that deploy handheld electronic devices 1 have a strong interest in protecting the data and access to their systems possible through the device 1. Accordingly, a lockout function 33 is provided that locks out access to the phone application 21 and additional applications 23 through the user interface 3 when activated. Typically, the lockout function is activated automatically upon the expiration of a selected time interval after the last user input through the user interface 3. The duration of the period for activation of the lockout is not important to the various aspects of this invention; however, the time period can vary over a wide range with any particular time interval being selected to meet the needs of a particular enterprise. As examples only, the time interval could be anywhere from less than a minute up to even 60 minutes. The shorter time periods can be frustrating to the user while the longer time periods reduce the protection provided by the feature. A suitable comprise is an interval of about one to two minutes.

The user can or cannot be given the ability to turn on and off the lockout 33. Where the user is not given this option, the lockout can be set at the device, or by a supervisor at the remote station 17 through the wireless connection 19.

When the user desires to use the device 1 while the lockout is activated, a security code such as a password must be entered through the user interface 3. It is typically not necessary to deactivate the lockout 33 in order to receive incoming phone calls. However, users have found it frustrating to have to enter the password in order to make outgoing phone calls. In accordance with aspects of this invention, an override 35 is provided that allows the user to place outgoing phone calls without the need to enter a security code yet still maintain lockout of the additional applications 23. Preferably, the user is given the option of whether or not to select the override 35. For instance, if the device 1 is going to be unattended, the user may choose to deselect the override. Some enterprises might be selective in whether or when to allow the users of certain of its devices to have the override option. Thus, in accordance with other aspects of the invention, the enterprise can require that a supervisor transmit to the specific device 1, such as from the remote station 17, an enable override authorization signal that must be received by the device before the user is able to select the override 35. In other words, the override must first be authorized by a supervisor before it is available for selection by the user.

Figure 3A:
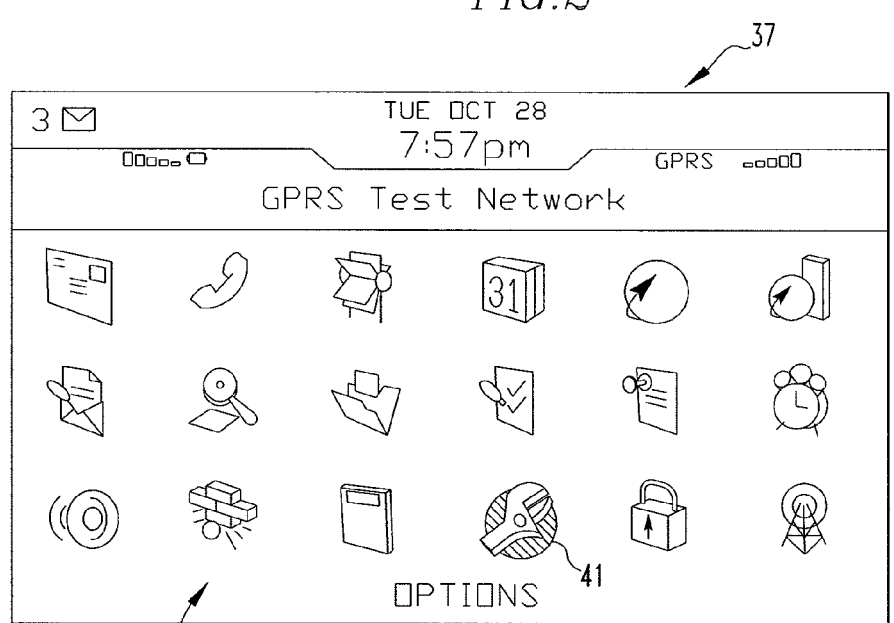
Figure 3D:
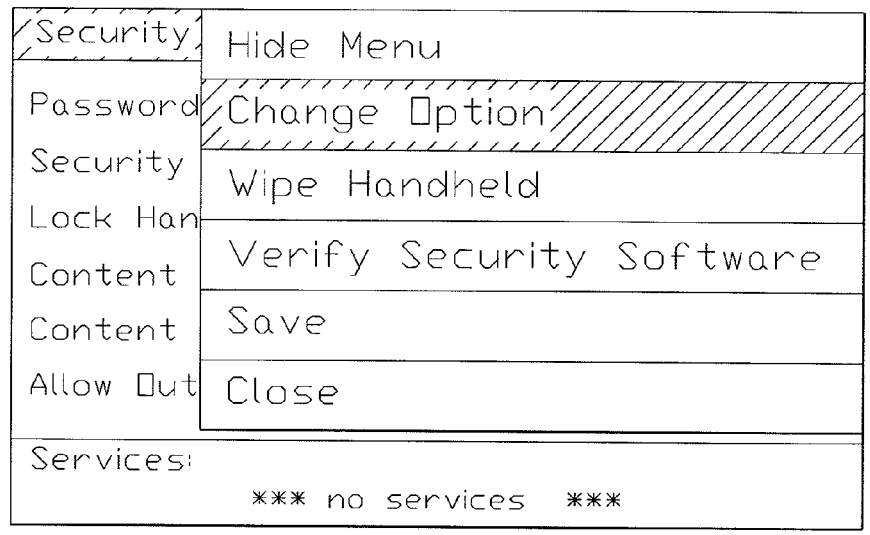
Figure 3E:
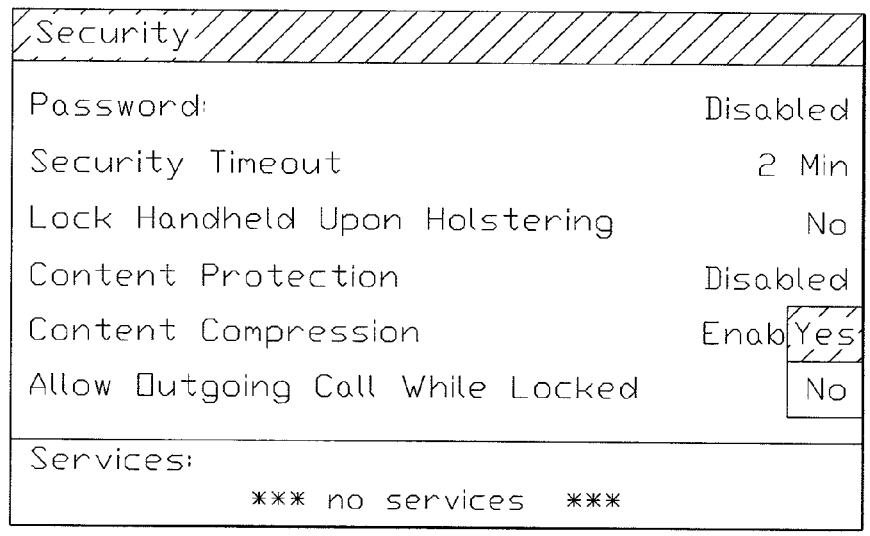
Figure 3F:
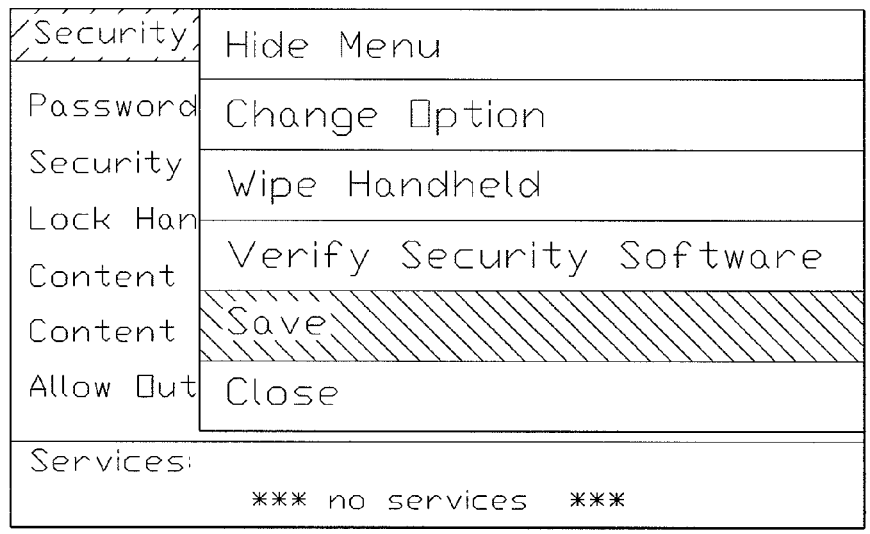

FIGS. 3a through 3m further illustrate aspects of the invention. FIG. 3a illustrates the home screen 37 that appears on the display 13 of the handheld electronic device 1. This home screen 37 displays icons 39 representing the various functions available to the user. A particular function is implemented by rotating the thumbwheel 9 to scroll through the icons 39. Each icon is sequentially highlighted during scrolling. In exemplary home screen, the options icon 41 is highlighted. The options function is called up by pressing inward on the thumbwheel 9. This brings up the options menu that is illustrated in FIG. 3b where the security option is shown highlighted by scrolling with the thumbwheel 9. Upon selection of the security option, the security submenu illustrated in FIG. 3c is displayed. As will be noted, the last entry is "Allow Outgoing Calls While Locked". This is the override, which in FIG. 3c is shown by the "NO" entry as not being selected. The user may then scroll down to that selection as shown by the highlight in FIG. 3c. Pressing of the thumbwheel then brings up the pull down menu shown in FIG. 3d where the "Change Option" is shown as highlighted. Pressing the thumbwheel then gives the user the option to select "YES" as shown in FIG. 3e, which brings back the pull down menu where the change in option can be saved as shown in FIG. 3f. The override has now been selected.

Figure 3G:
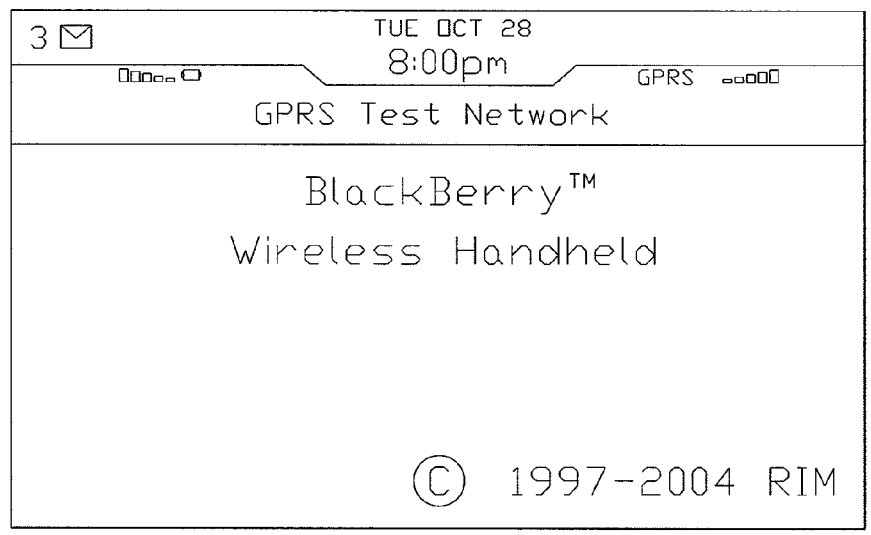
Figure 3H:
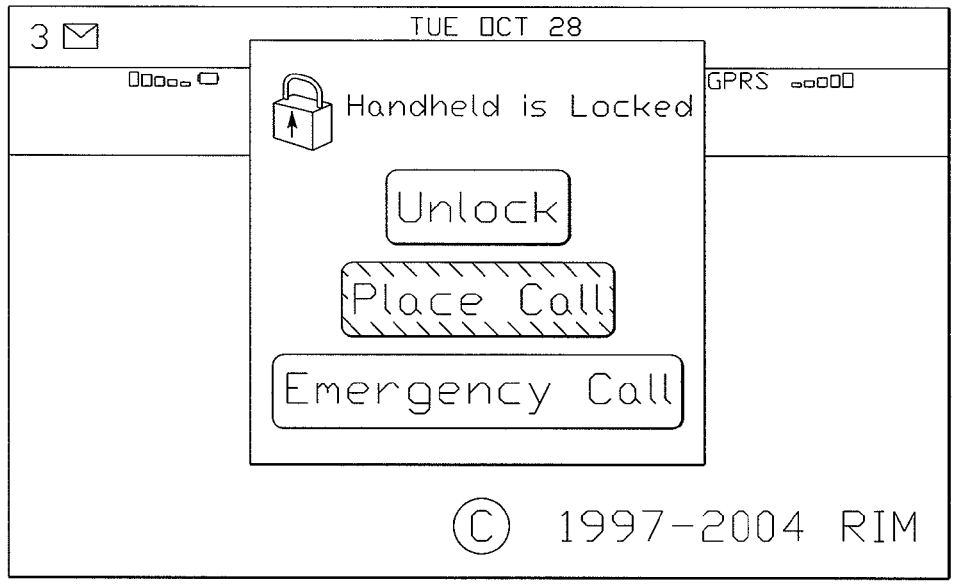
Figure 3I:
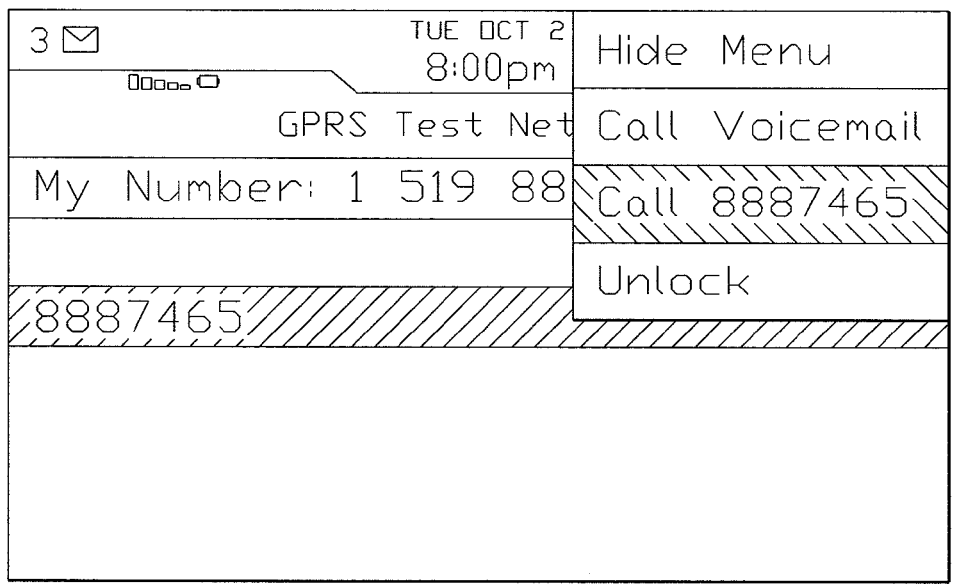

Upon time out of the lockout, the security lock screen illustrated in FIG. 3g is presented on the display 13. Any operation of the user interface 3 such as by rotating or pressing the thumbwheel 9 or actuating any of the keys 7, brings up the security lock screen illustrated in FIG. 3h. The user can gain access to full operation of the device 1 by selecting "Unlock" and entering the required security code such as a password. The user can always make an emergency call to a preselected emergency number such as 911 even when the lockout is activated by selecting "Emergency Call". Alternatively, as the override has been selected, the user can place an outgoing call using the phone application 23 while maintaining the lock on the other applications 25 by selecting "Place Call". This brings up a place call phone screen as shown in FIG. 3i. The user can then manually dial in a number using the keyboard 5. Clicking on the selected number brings up the pull down menu shown from which the outgoing call can be initiated by clicking on the number which is highlighted. As shown by the pull down menu, the user has the option of checking the voicemail or choosing to deactivate the lockout (and therefore enter their password) such as where it may be necessary to check the address book application 25.

Figure 3J:
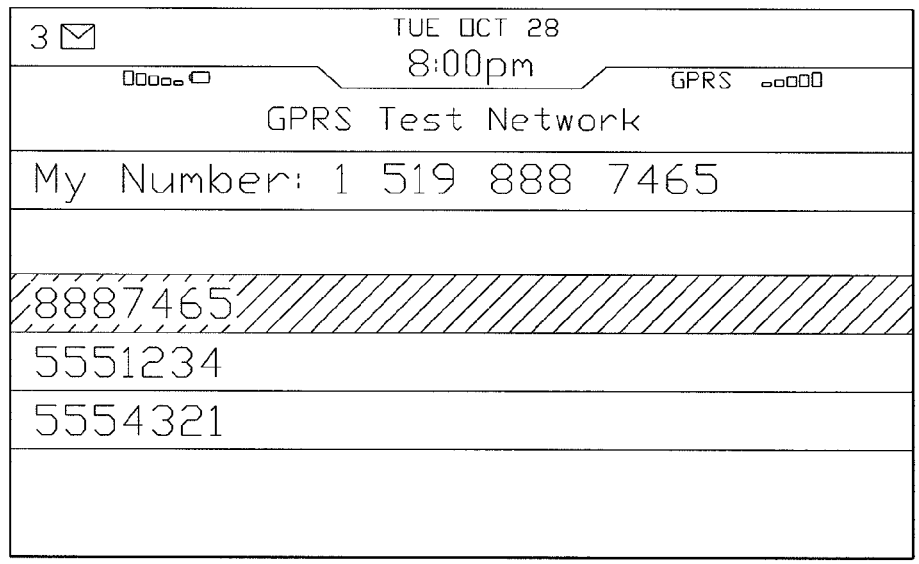

In accordance with another aspect of the invention, the phone screen can display a "hot list" such as shown in FIG. 3j from which a number can be highlighted and called as previously described. Various types of "hot lists" can be used. For instance, the hot list can list a selected number of the most recently called phone numbers, a list of the most frequently called numbers, alphabetical list, or a call log list. Alternatively, the user can make a call in override using the common speed dial option in which particular keys on the keyboard are programmed to dial a selected number when actuated. Basic numeric phone numbers can also be manually entered to be dialed.

Figure 3K:
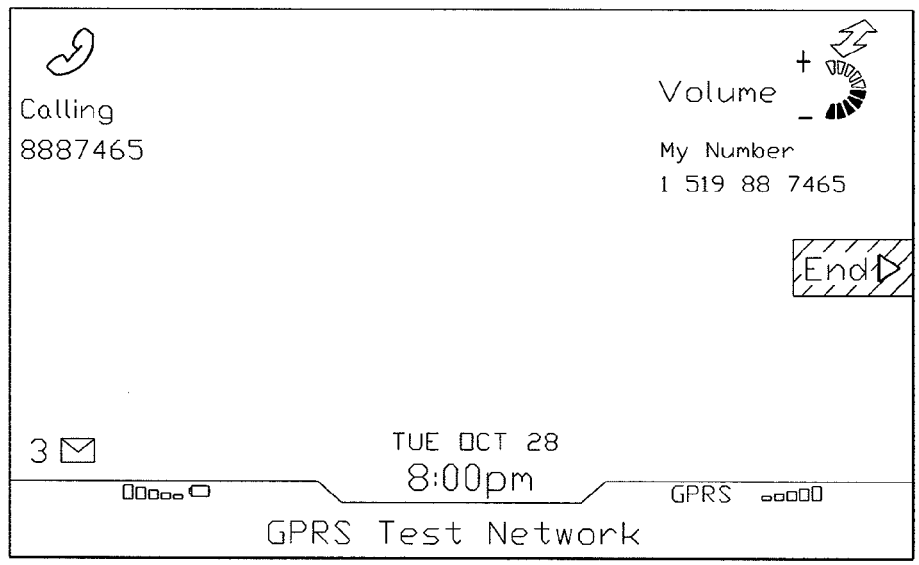
Figure 3L:
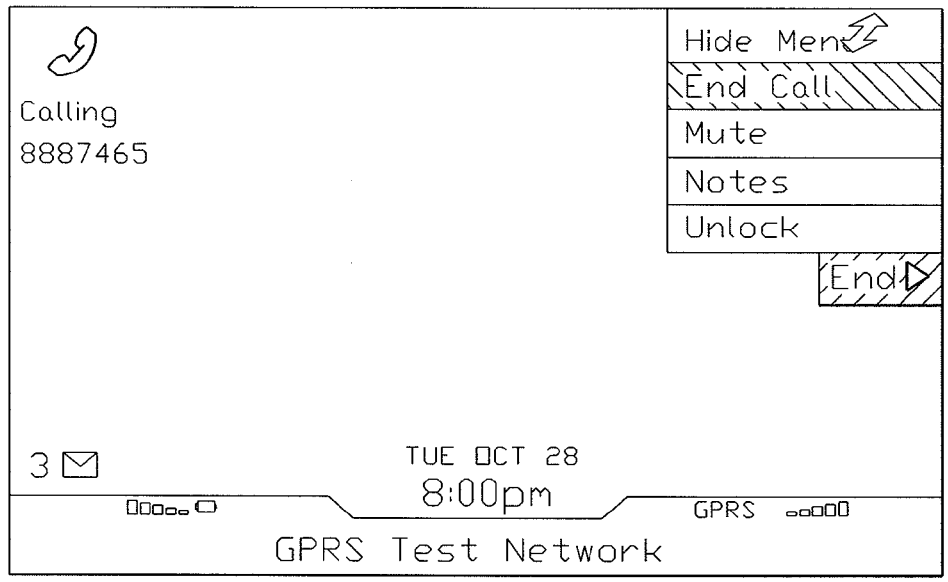
Figure 3M:
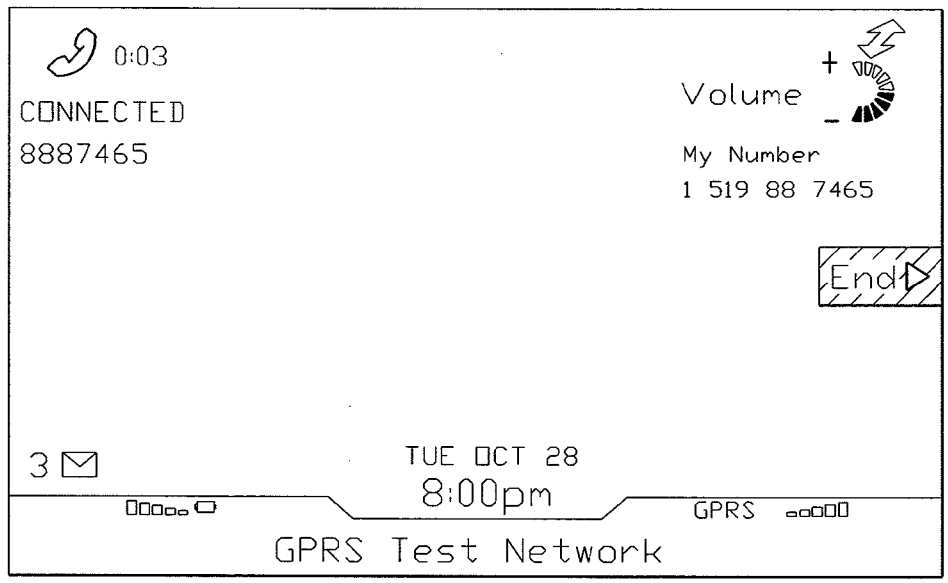

While the call is being placed with override selected, the screen shown in FIG. 3k is displayed. As noted on the right hand side, the sound volume can be adjusted by rotating the thumbwheel 9. If the user has a change of mind and wishes to terminate the call while calling, the thumbwheel is pushed in which calls the pull down menu shown in FIG. 3l from which "End Call" can be selected. When the call is connected, the call connected screen shown in FIG. 3m is displayed. The call can be ended in the manner just described.

Figures 4, 5:
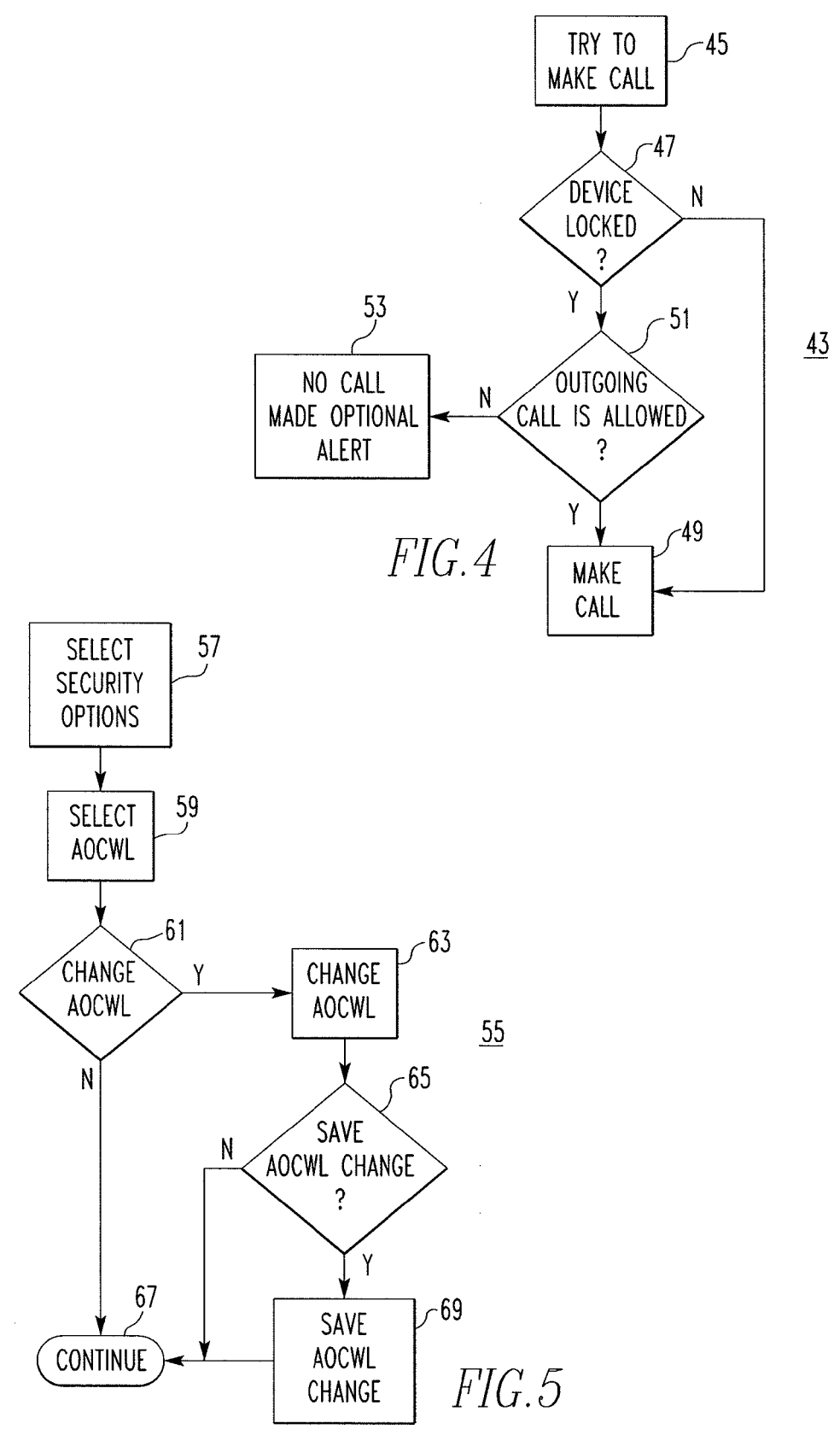

FIG. 4 illustrates a flowchart 43 for aspects of the invention directed to making a call from the handheld device that can be locked out and having the override which allows outgoing calls to be made while the lockout is activated. When a user tries to make a call at 45 a determination is made at 47 as to whether the device is locked out, that is, whether the lockout 33 has been activated. If not, the user can proceed to make a call at 49. However, if the device is locked out at 47, then a determination is made at 51 as to whether the outgoing calls are allowed while locked out. For instance, whether the override 35 has been selected. If so, the call can be made at 49. If the override has not been selected for the locked out device, then as indicated at 53, no call can be made and optionally, an alert can be generated, for instance, visually and/or aurally.

The user can still make a call under these circumstances by deactivating the lockout through entry of the password.

FIG. 5 illustrates a flowchart 55 for selecting the option to allow outgoing calls while the handheld electronic device 1 is locked. The process begins by the user employing the user interface 3 to select security options, as indicated at 57. Within the security options, the option to "ALLOW OUTGOING CALLS WHILE LOCKED" (AOCWL) is selected at 59. This will indicate to the user whether the AOCWL has been selected to allow outgoing calls while locked out or not. If the user decides to change the selection of AOCWL, the selection is made at 63. The user is then given the option of saving the change at 65 before continuing at 67. When the user chooses to save the change, it is implemented at 69. In another embodiment, the mere selection of the override (AOCWL) at 59 can automatically effect the toggling of the function with an automatic save.

While specific embodiments of the invention have been described in detail, it will be appreciated by those skilled in the art that various modifications and alternatives to those details may be developed in light of the overall teachings of the disclosure. Accordingly, the particular arrangements disclosed are meant to be illustrative only and not limiting as to the scope of the invention which is to be given the full breadth of the claims appended and any and all equivalents thereof.

The invention claimed is:

1. A handheld electronic device comprising:
    a phone application for making outgoing and receiving incoming phone calls;
    at least one additional application implemented through the user interface;
    a lockout for locking out the making of outgoing phone calls by the phone application and any of the additional applications while allowing the receipt of incoming phone calls; and
    an override, made available for selection by an enable override authorization signal transmitted to the handheld electronic device from a remote supervisory location, upon being made available and having been selected for making outgoing phone calls by the phone application while maintaining the lockout of the additional applications when the lockout is activated.

2. The handheld electronic device of claim 1 wherein the phone application further comprises a hot list from which outgoing phone calls are made with the lockout activated and the override selected.

3. The handheld electronic device of claim 2 wherein the hot list is selected from a group consisting of:
    a list of frequently called phone numbers,
    a list of most recently called phone numbers,
    an alphabetical list of most frequently called phone numbers, and
    a call log list.

4. The handheld electronic device of claim 1 further comprising:
    a user interface including a keyboard having keys; and
    wherein the phone application includes a speed dial option by which selected keys are programmed to initiate the outgoing phone calls to selected phone numbers when actuated, the speed dial option being usable when the lockout is activated and the override is selected.

5. The handheld electronic device of claim 4 wherein the lockout must be deactivated for the override to be enabled.

6. The handheld electronic device of claim 5 wherein the lockout has a security code that must be entered before the lockout is deactivated.

7. The handheld electronic device of claim 6 wherein the lockout is activated when the user interface does not receive a user input for a predetermined period of time.

8. The handheld electronic device of claim 4 wherein the user interface comprises a keyboard having keys that are sequentially actuated to dial a selected phone number when the lockout is activated and the override is selected.

9. A method of operating a handheld electronic device having a phone application and additional applications, the method comprising the steps of:
    selectively locking out the additional applications and the making of outgoing phone calls by the phone application while allowing receipt of incoming phone calls;
    receiving on the handheld from a remote supervisory location an enable override authorization signal;
    responsive to the receiving, making available for selection an override option; and
    overriding the locking out of making outgoing phone calls by the phone application while maintaining the lockout of the additional applications by selecting the override option.

10. The method of claim 9 wherein making an outgoing phone call while the additional applications remain locked out comprises the step of presenting the user with a hot list from which the outgoing phone call is made.

11. The method of claim 10 wherein the hot list is selected from a group comprising:
    a list of most recent phone numbers called,
    a list of most frequent phone numbers called,
    an alphabetical list of most frequently used phone numbers and a call list.

12. The method of claim 10 wherein presenting the user with the hot list comprises the step of displaying the hot list on a display screen.

13. The method of claim 9 wherein the making of the outgoing phone call while the additional applications are locked out comprises the step of providing a number of keys, programming each of the number of keys with the selected phone number, and dialing the selected phone number when a selected one of the number of keys is actuated.

14. The method of claim 9 wherein overriding the locking out of outgoing phone calls requires that the override be enabled before it is selected, and wherein the override can only be enabled when the lockout is deactivated.

15. A method of protecting data belonging to an enterprise via access through at least one handheld electronic device, the handheld electronic device having a phone application and additional applications, the method comprising the steps of:
    deploying at least one handheld electronic device to an enterprise user;
    selectively locking out the additional applications and the making of outgoing phone calls by the phone application while allowing receipt of incoming phone calls;
    an enterprise supervisor providing an enable override authorization signal;
    receiving on the handheld from a remote supervisory location an enable override authorization signal;
    responsive to the receiving, making available for selection an override option; and
    overriding the locking out of making outgoing phone calls by the phone application while maintaining the lockout of the additional applications by selecting the override option; and
    the enterprise user making an outgoing phone call while the additional applications remain locked out.

16. The method of claim 15 wherein, prior to the step of the enterprise supervisor providing an enable override authorization signal, the method includes the further step of the enterprise user requesting enablement of the override authorization signal.

17. The method of claim 15 wherein making an outgoing phone call while the additional applications remain locked out comprises the step of presenting the user with a hot list from which the outgoing phone call is made.

18. The method of claim 17 wherein the hot list is selected from a group comprising:
   a list of most recent phone numbers called;
   a list of most frequent phone numbers called; and
   an alphabetical list of most frequently used phone numbers and a call list.

19. The method of claim 17 wherein presenting the user with the hot list comprises the step of displaying the hot list on a display screen.

20. The method of claim 15 wherein the making of the outgoing phone call while the additional applications are locked out comprises the step of providing a number of keys, programming each of the number of keys with the selected phone number, and dialing the selected phone number when a selected one of the number of keys is actuated.

* * * * *